3,563,858
AERATION AND FOAM CONTROL IN SPARGED FERMENTATION
George R. L. Worthington, Berkeley, Hyman Wolochow, Castro Valley, and Mark A. Chatigny, San Lorenzo, Calif., assignors, by mesne assignments, to the United States of America as represented by the Secretary of the Navy
Filed Sept. 27, 1967, Ser. No. 671,160
Int. Cl. B01d *19/02;* C12b *1/18*
U.S. Cl. 195—107                        7 Claims

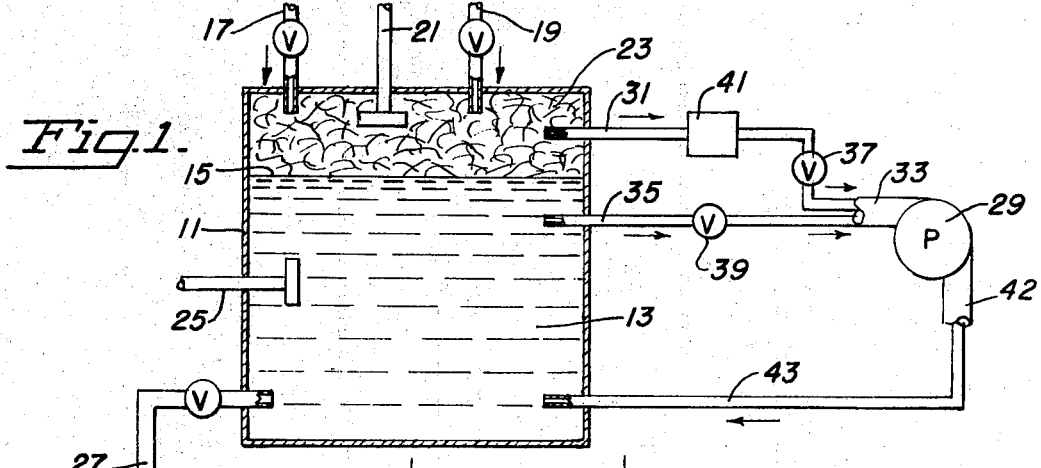
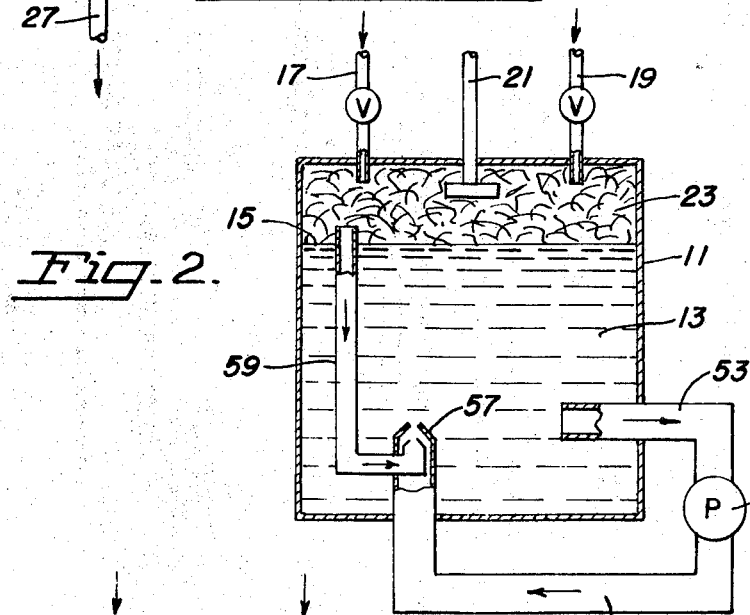
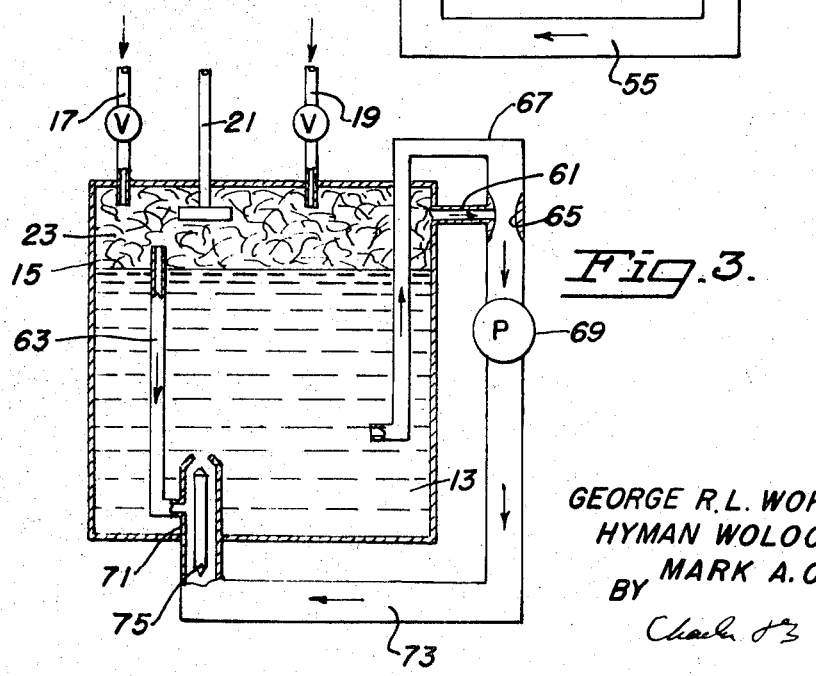
INVENTORS
GEORGE R. L. WORTHINGTON
HYMAN WOLOCHOW
MARK A. CHATIGNY
BY
ATTORNEY

United States Patent Office 3,563,858
Patented Feb. 16, 1971

ABSTRACT OF THE DISCLOSURE

The method of controlling foam generated by the biological reaction of a fluid culture medium in a container wherein the inlet of a pump is connected to withdraw foam from the head space above the culture medium and to withdraw culture medium from the container. The pump compresses the withdrawn foam and intimately mixes the withdrawn foam, insluding the air and microbial mass contained therein, and the withdrawn medium. This compressed mixture of withdrawn foam and withdrawn culture medium is then reintroduced into the culture medium in the container thereby resulting in the intimate dispersion of the air, the microbial mass and the culture medium within the container.

The invention described herein may be manufactured and used by or for the Government of the United States of America for governmental purposes without the payment of any royalties thereon or therefor.

The production of large quantities of microbial mass or their by-products by biological reactions frequently requires considerable sparging of the fluid culture media with air or other gases. This sparging, which generally comprises aeration and mixing of the culture media, often results in copious production of foam above the surface of the culture media. This foam is generated at a very large rate and, depending upon the size of the vessel, will often occupy all of the head space above the culture media in a very short period of time. It is therefore necessary to remove or prevent the development of this foam.

One method used for foam control is the use of antifoam agents to prevent the development of foam. However, these agents interfere with the product's purity, oxygen uptake by the culture medium and with subsequent product handling. Other methods of controlling foam have been by the application of ultrasonic energy to the foam and the breaking of foam by a high velocity jet baffle device. Still another method of foam control is to discharge excess foam from the container. However, since the foam includes fairly substantial quantities of the microbial mass that is being generated in the culture medium it is not economical to discharge the foam as a waste product. These methods of foam control have been relatively expensive and generally require the safe disposal of contaminated process gases.

In biological reactions employing aerobic processes there are generally three basic functions which must be performed in order to achieve the effective production of microbial mass or product. First, the culture medium must be aerated. It is generally desirable to aerate at a high rate since this will increase the biological reaction and therefore increase the yield of microbial mass. However, with increased aeration there is an increase in foam which must be properly handled or controlled. Second, the foam generated by aeration should be reintroduced into the culture media. Third, it is necessary to stir the air, foam and culture medium to provide a uniform culture medium to enhance the biological process. Previous methods for achieving these three functions have been by the use of separate devices or techniques for each function. For example, separator aerator equipment is used to introduce air directly into the cultural medium. Separate equipment is used to dispose of the foam. And separate stirring equipment, such as an impeller or paddle device, is used to mix the air and foam (when reintroduced) with the culture medium.

The present invention performs these three functions by a single unit which provides an extremely efficient and high yield biological reaction process.

Briefly, in accordance with the present invention air or other gases may be introduced directly into the head space above the culture medium or it may be introduced directly into the culture medium, or both. Many biological processes are very complex and the additives and other products that emanate from the biological reaction are a part of the generated foam and are very complex also. The term foam, therefore, will refer to that matter contained in the head space which may include one or more of air, culture medium, microbial mass, or other gases, liquids or solid matter. The inlet of a pump, which may be of the rotary type, is connected by one conduit to the container volume above the surface of the culture medium and by another conduit to the container volume below the surface of the culture medium. The outlet of the pump is connected by still another conduit to the container volume below the surface of the culture medium. In this manner the pump withdraws foam and culture medium from the container, compresses and mixes the withdrawn foam and withdrawn culture medium (the mixture is herein referred to as treated culture medium) and introduces the treated culture medium into the culture medium in the container. The treated culture medium mixes very rapidly with the culture medium in the container resulting in excellent aeration and dispersion of the microbial mass and other products with the culture medium in the container.

The present invention also encompasses the withdrawal of foam from the head space and compressing this withdrawn foam and then introducing this compressed foam into the culture medium in the container. Although this embodiment is not as efficient as the embodiment discussed above, where culture medium is also withdrawn and mixed with the compressed foam, it has been found to be effective in certain applications of foam control.

It has been found that the compressing and mixing process, that takes place within the pump, brings about an intimate contact of the withdrawn foam and the withdrawn culture medium and excellent dispersion of the withdrawn foam in the withdrawn culture medium. Since the withdrawn foam includes air, microbial mass, and other products the compressing and mixing within the pump of the withdrawn foam and withdrawn culture medium results in the treated culture medium having a very high degree of aeration and a large concentration of microbial mass and other products. Therefore, when the treated culture medium is introduced directly into the culture medium in the container there is a very rapid mixing and intimate dispersion of the treated culture medium and the culture medium in the container.

As a result it has been found unnecessary to use separate stirring devices, separate aerators and separate foam controllers as has been heretofore considered necessary. It is to be understood that practice of the present invention may be achieved by withdrawing only the foam, compressing only the foam, and introducing only the compressed foam into the culture medium in the container. However, it has been found and it is the preferred method, to withdraw both foam and culture medium, compress and mix both, and then introduce this mixture into the culture medium in the container.

Other objects, advantages and novel features of the invention will become apparent from the following detailed description of the invention when considered in conjunction with the accompanying drawings wherein:

FIG. 1 is a schematic drawing of one embodiment of the present invention;

FIG. 2 is a schematic drawing of another embodiment of the present invention; and FIG. 3 is a schematic drawing of still another embodiment of the present invention.

Referring now to FIG. 1 is illustrated a container or vessel 11 which is closed at the top and contains a culture medium or other fluid 13. The culture medium fills vessel 11 to a certain level, as illustrated by reference numeral 15, thereby providing a head space 23 between upper surface 15 of the culture medium and the top enclosure of vessel 11. Inlet conduit 17 is provided for the introduction of air into head space 23. Inlet conduit 19 provides for the introduction of other material such as additional culture medium or other additives useful in the biological reaction that takes place in culture medium 13. Sensor 21 is provided to measure the pressure, temperature, composition or other characteristics of the foam or other materials contained in head space 23. Sensor 25 is provided to measure the various characteristics of culture medium 13. Product outlet conduit 27 is provided to drain off the culture medium and microbial mass and other by-products contained in the culture medium for subsequent processing. Most generally, the subsequent processing involves the removal of the microbial mass and other products from the culture medium for further refinement and ultimate usage.

Contained in head space 23 is the foam generated in the culture medium during the biological reaction process which generally takes place while the culture medium is being aerated by means of the air introduced through inlet conduit 17. It should be noted that, by conventional aeration processes, inlet conduit 17 would be positioned at the bottom of the container 11 such that the oxygen or other gases introduced by this inlet conduit would bubble through the culture medium 13 to become mixed therewith to aid the biological reaction of the culture medium. As used herein the term foam will refer to that matter contained in head space 23 which may include air, culture medium, microbial mass, or other gases, liquids or solid matter. It is to be understood that the air, or other gases, may be introduced through conduit 17 directly into head space 23, or the air, or other gases, may be introduced directly into the culture media 13, or both. This air then becomes part of the foam which is subsequently introduced into the culture medium as hereinafter described. The foam contained in head space 23 of container 11 is withdrawn by pump 29 through outlet conduit 31 and is introduced into inlet conduit 33 of pump 29. The culture medium 13 is simultaneously withdrawn by pump 29 from container 11 through outlet conduit 35 and is also introduced into inlet conduit 33 of pump 29. Control valves 37 and 39 are respectively provided to regulate the flow in outlet conduits 31 and 35. Although not required for practice of the present invention, included in conduit 31 is a mechanism 41 which may be used to allow excess $CO_2$ to be removed from the foam with a minimum removal of $O_2$. This may be achieved by various techniques such as those described in Science, vol. 156, pages 1481 through 1484, dated June 16, 1967. This may be desirable when the equipment is operated over a relatively long time period where there is a large build-up of $CO_2$ due to the conversion of $O_2$ by the biological reaction. Otherwise it may be necessary to periodically stop the process and purge the apparatus of all gases.

The withdrawn foam (from conduit 31) and the withdrawn culture medium (from conduit 35) are compressed and mixed in pump 29. It has been found that this compressing and mixing brings about an intimate contact of the withdrawn foam and the withdrawn culture medium which results in excellent dispersion of the withdrawn foam in the withdrawn culture medium. Since the withdrawn foam includes air, microbial mass and other products, the compressing and mixing within the pump results in a treated culture medium having a greater degree of aeration and a greater concentration of microbial mass than does the culture medium in the container. This treated culture medium is discharged through outlet 42 of pump 29 and then through outlet conduit 43 which discharges the treated culture medium into the culture medium within container 11. When the treated culture medium is introduced directly into the culture medium 13 in container 11 there is a very rapid mixing and intimate disperson of the treated culture medium and the culture medium in the container. It can therefore be seen that the pump brings about intimate contact of the foam with the culture medium which has been heretofore performed by separately introducing the air into culture medium 13, seperately withdrawing the foam contained in head space 23 and introducing it into culture medium 13, and mixing the culture medium 13, the introduced air and the introduced foam by a separate stirring device.

As a result of the present invention it has been found that very large yields of microbial mass and their by-products are achieved. One example of the use of this invention is the production of bacterial virus produced from an infected bacterial culture. The amount of bacterial virus is proportional to the degree of aeration and the degree of aeration has been heretofore primarily limited by the foam generated by the increased aeration. By means of the present invention it is now possible to provide much greater aeration of the culture medium which results in a much greater yield and a faster production of microbial mass in bacterial virus from a given volume of culture medium. By use of this method it has been found possible to produce a bacterial virus yield in excess of $10''$ bacterial virus particles per cubic centimeter.

The flow rates of the culture medium through outlet conduit 35 and the foam through outlet conduit 31 may be adjusted by valves 37 and 39 respectively to meet the particular needs of the process employed. The flow rate of the foam is principally determined by the desired aeration and by the rate of foam generation. It has been found that the flow rate ratio of the withdrawn foam to the withdrawn culture medium is desirable to the extent that sufficient withdrawn cultured medium is provided to intimately mix with the withdrawn foam where the resultant treated culture medium provides adequate aeration and mixing of the microbial mass of the foam with the culture medium in the container. In addition it is desirable to have a sufficient flow rate of withdrawn culture medium to provide effective pump sealing. An example of a typical use of the present invention is as follows. A container having about 3 gallons of culture medium and having a withdrawn culture medium flow rate of about 20 gallons per minute and a withdrawn foam flow rate of about 5 gallons per minute resulting in an about 4 to 1 ratio.

In FIG. 2 is schematically illustrated another embodiment of the present invention. In this embodiment culture medium 13 is withdrawn from container 11 by means of pump 51 through outlet conduit 53. The outlet of pump 51 is connected to inlet conduit 55 which is inserted into vessel 11. Inlet conduit 55 terminates at nozzle section 57 which functions as a pump. The foam is introduced into nozzle section 57 through conduit 59 and is mixed with the withdrawn culture medium in section 57. Although there is a substantial amount of mixing and condensing of the foam-air mixture in nozzle section 57 it has been found that this technique does not perform as well as the embodiment illustrated in FIG. 1.

In FIG. 3 is shown still another embodiment of the present invention which combines the features of the embodiment set forth in FIGS. 1 and 2. In the FIG. 3 embodiment the foam is withdrawn from head space 23 through outlet conduits 61 and 63. Outlet conduit 61 is connected to restricted low pressure section 65 of outlet conduit 67 through which culture medium 13 is withdrawn by pump 69. The outlet of pump 69 is connected to section 71 by means of outlet conduit 73. The treated culture medium from pump 69 is again treated with foam as it passes through section 71. Foam is drawn into and mixed with the treated culture medium in suction section 17 due to the low pressure and high velocity of the treated culture medium caused by restrictor 75. This technique of foam control has been found to be quite effective and embodies the advantages of both the embodiments set forth in FIGS. 1 and 2.

It is to be understood that the present invention is not to be limited to the control of foam generated in culture media. That is, the present invention may be used to control the foam or other gases separating from the body of or to be added to any sparged liquid by introducing the foam or other gases into the body of sparged liquid. For example, the present invention may be used in the production of highly saturated fats where hydrogen gas is used for sparging unsaturated fats and the foam or other gases separating from the sparged unsaturated fats is introduced into the unsaturated fats by practice of the present invention.

What is claimed is:

1. The method of controlling foam during sparging of a liquid medium in a container comprising the steps of:
(a) withdrawing part of the foam;
(b) withdrawing part of the liquid medium;
(c) compressing and mixing the withdrawn foam and the withdrawn liquid medium; and
(d) introducing the compressed and mixed foam and liquid medium into the liquid media in the container.

2. The method of claim 1 wherein:
(a) said withdrawn foam and said withdrawn liquid medium are simultaneously withdrawn by a pump.

3. The method of claim 2 wherein:
(a) said withdrawn foam and said withdrawn liquid medium are compressed and mixed in said pump.

4. The method of claim 2 wherein:
(a) said pump is a rotating vane pump.

5. The method of claim 1 wherein:
(a) air is introduced directly into the head space above said liquid medium in said container.

6. The method of claim 5 wherein:
(a) said liquid medium is a culture medium and said withdrawn foam includes air wherein said compressed and mixed foam and culture medium that is introduced into the culture medium in said container results in aeration and dispersion of microbial mass in the culture medium in said container.

7. The method of claim 1 wherein:
(a) the ratio of the flow rate of said foam to the flow rate of said withdrawn liquid medium is about 1 to 4.

References Cited

UNITED STATES PATENTS

| | | | |
|---|---|---|---|
| 2,206,507 | 7/1940 | Kuhni | 252—361 |
| 2,995,497 | 8/1961 | Heden | 195—107 |
| 2,635,070 | 4/1953 | Gordon et al. | 195—107X |
| 3,354,050 | 11/1967 | Rungaldier et al. | 195—107X |

A. LOUIS MONACELL, Primary Examiner

G. M. NATH, Assistant Examiner

U.S. Cl. X.R.

252—361